United States Patent
Hawkins

[11] Patent Number: 6,120,409
[45] Date of Patent: Sep. 19, 2000

[54] PLANETARY GEAR SHIFTING HUB FOR A BICYCLE

[76] Inventor: Tranel Hawkins, 831 Spencer Ave., San Jose, Calif. 95125

[21] Appl. No.: 09/016,840
[22] Filed: Jan. 30, 1998

Related U.S. Application Data

[63] Continuation-in-part of application No. 08/725,077, Oct. 2, 1996, abandoned.

[51] Int. Cl.[7] ........................................... F16H 1/28
[52] U.S. Cl. ................................................. 475/275
[58] Field of Search ............................................. 475/275

[56] References Cited

U.S. PATENT DOCUMENTS

| | | | |
|---|---|---|---|
| 2,038,799 | 4/1936 | Masson | 475/275 |
| 3,136,179 | 6/1964 | Kaiser | 475/275 |
| 5,273,501 | 12/1993 | Schievelbusch | 476/40 |
| 5,527,230 | 6/1996 | Meier-burkamp | 475/275 |
| 5,556,354 | 9/1996 | Meier-burkamp | 475/275 |

Primary Examiner—Dirk Wright
Attorney, Agent, or Firm—Robert Samuel Smith

[57] ABSTRACT

A variable transmission hub especially for a bicycle featuring a hub housing with spoke ends attached and rotatably mounted on the wheel axel. The conical hub has an internal surface with gears concentrically formed on the internal surface providing a set of concentric gears having a range of ratios. Independent gear assemblies couple each internal gear to a drive cylinder rotatably mounted on the axle and having a drive gear (sprocket) mounted on one end. A cam cylinder is mounted to slide on the axle which, at a selected location along the axle forces a clutch pin slidably positioned in the drive sleeve to engage the selected sun gear. The position of the sliding cam is selected by the user pulling on one end of a cable whose other end is secured to the sliding cam cylinder.

9 Claims, 5 Drawing Sheets

PLANETARY GEAR SHIFTING HUB FOR A BICYCLE

CROSS REFERENCE TO PREVIOUS APPLICATIONS

This application is a continuation-in-part of application Ser. No. 08/725,077 filed Oct. 2. 1996 now abandoned.

FIELD OF THE INVENTION

This invention relates to bicycle drive hubs and particularly to a drive hub with multiple sets of planetary gears for providing a multiple number of drive to driven ratios.

PRIOR ART AND INFORMATION DISCLOSURE

The object in incorporating a transmission into a bicycle is to reduce the effort necessary by the rider to accomodate to the upgrades and downgrades that are encountered in the typical bicycle trip. As the technology for building bicycles matures, numerous disclosures have been directed toward producing more efficient transmissions in terms of reduced cost, simplicity of construction consistent with providing a wide range of mechanical advantages of the transmission with smallest incremental difference between successive mechanical advantages.

U.S. Pat. No. 3,136,179 to Kaiser discloses a multiple speed hub in which changes in transmission ratio of a planetary gearing interposed between the driven ratchet wheel and the shell of the hub can be achieved by back pedalling.

U.S. Pat. No. 5,273,501 to Ulrich discloses a hub sleeve rotatably mounted on a hub axle and driven by a driver mounted on the hub axle through a friction gear. Continuous variation of transmission ratio is achieved by continuous variation of orientation of toroidal disks comprising the friction gear.

OBJECTS

Friction gears of the type described in the prior art are subject to eventual malfunction due to wear occurring over a period of time. It is therefore an object of this invention to provide a transmission shifting hub that would have the advantages of relatively small incremental changes of transmission ratio over a large range of ratio and yet retain the characteristic of minimizing problems associated with friction coupled components and complexity of construction.

It is also an object of this invention to provide a hub that is characterized by simplicity of construction and therefore is more maintenance free and economical than the hubs of the prior art.

SUMMARY

This invention is directed toward a hub housing anchoring ends of wheel spokes around its periphery. The hub housing is rotatably mounted on a cylindrical drive sleeve which, in turn, is rotatably mounted on a stationary axel. The axle supports the forks of the frame. In one embodiment, the internal surface of the hub housing is stepped and in each step is nested an assembly of gears. Each assembly includes an assembly housing with an internal gear that engages planetary gears. The planetary gears engage a sun gear, one sun gear for each assembly of gears rotatably mounted on the drive sleeve. Each sun gear is selected to drive the hub housing by a clutch slide that is slidably and rotationally positioned on the axel to push a selected catch (one catch for each sun gear) into engagement with an internal surface of the respective sun gear. As the cylinder is moved to a particular location, it contacts internally facing ends of one of the sets of clutch pins nested in the drive sleeve forcing the other end of the clutch pin into engagement with the internal ratchet surface of the respective sun gear. Each assembly housing mounted inside the hub housing has a ratchet pin sliding in contact with the inside surface of the hub housing and each ratchet pin is spring biased to engage the hub housing when the hub housing turns in one direction only. Positioning of the clutch slide on the axle (to select the desired sun gear) is accomplished by the operator pulling on a wire to move the slide in one direction and a spring biasing the slide to move in the opposite direction.

DESCRIPTION OF PREFERRED EMBODIMENTS

Figure 1:
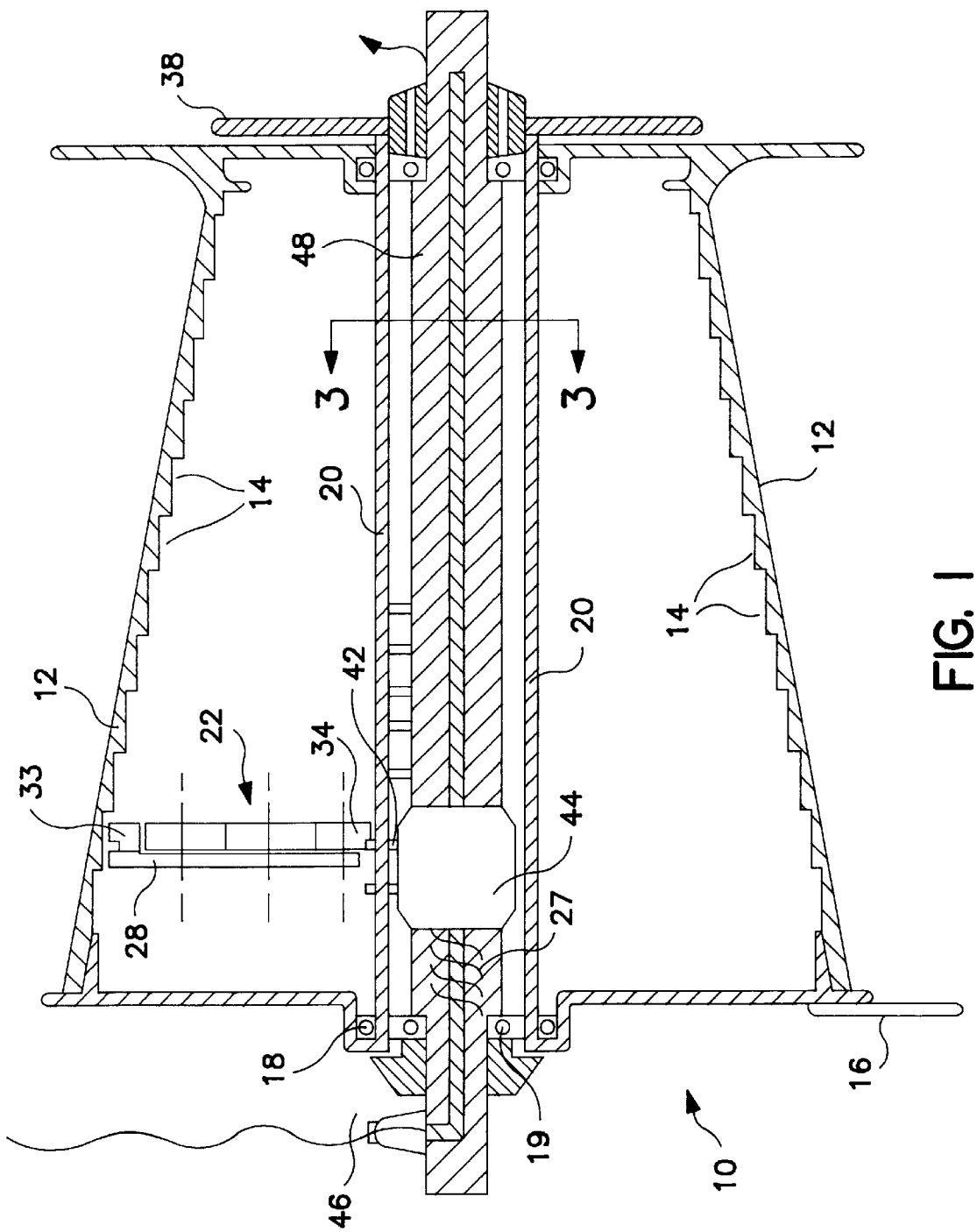
FIG. 1 shows a sectional assembly view of the drive hub of this invention.

Turning now to a discussion of the drawings, FIG. 1 shows a sectional view of the hub 10 having a hub housing 12 with a stepped internal surface wherein each step 14 encloses a gear assembly 22. The ends of wheel spokes 16 are attached to one end of the hub housing 12. The hub housing 12 is rotatably mounted by bearings 18 on a drive sleeve 20 which, in turn, is rotatably mounted by bearings 19 on stationary axel 21 Only one gear assembly 22 is shown in FIG. 1 but it should be understood that each step 14 has nested therein a respective gear assembly 22 of the set of assemblies.

Figure 2:
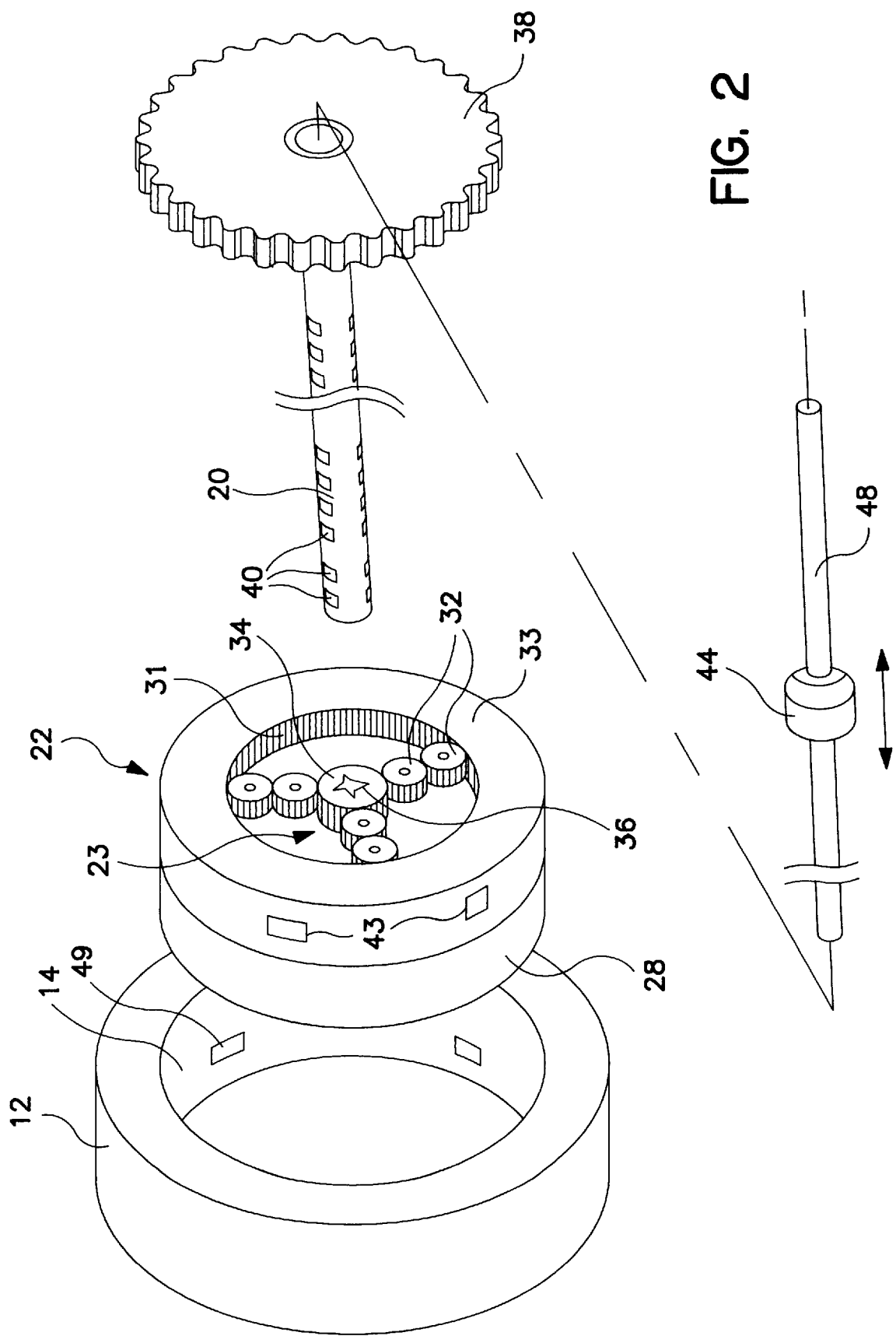
FIG. 2 is an exploded perspective view showing details of the coupling gear set.

Details of each gear assembly 22 are illustrated in the perspective exploded view of FIG. 2 where is also shown a cutaway view of the hub housing 12 with stepped internal surface 14 for receiving gear assemblies 22. Each gear assembly 22 includes an array of planetary gears 32 rotatably mounted on a base disk 28. Base disk 28 is rotatably mounted on drive sleeve 20. A total of six planetary gears 32 are shown. The set of planetary gears 32 engages a central sun gear 34 which has an internal ratchet surface 36 and is rotatably mounted on drive sleeve 20. The set of planetary gears 32 also engages a geared surface 31 being the internal surface of ring gear 33.

The sprocket gear 38 is mounted on the drive sleeve 20 and is driven by a sprocket chain not shown but well known in the art.

Figure 3:
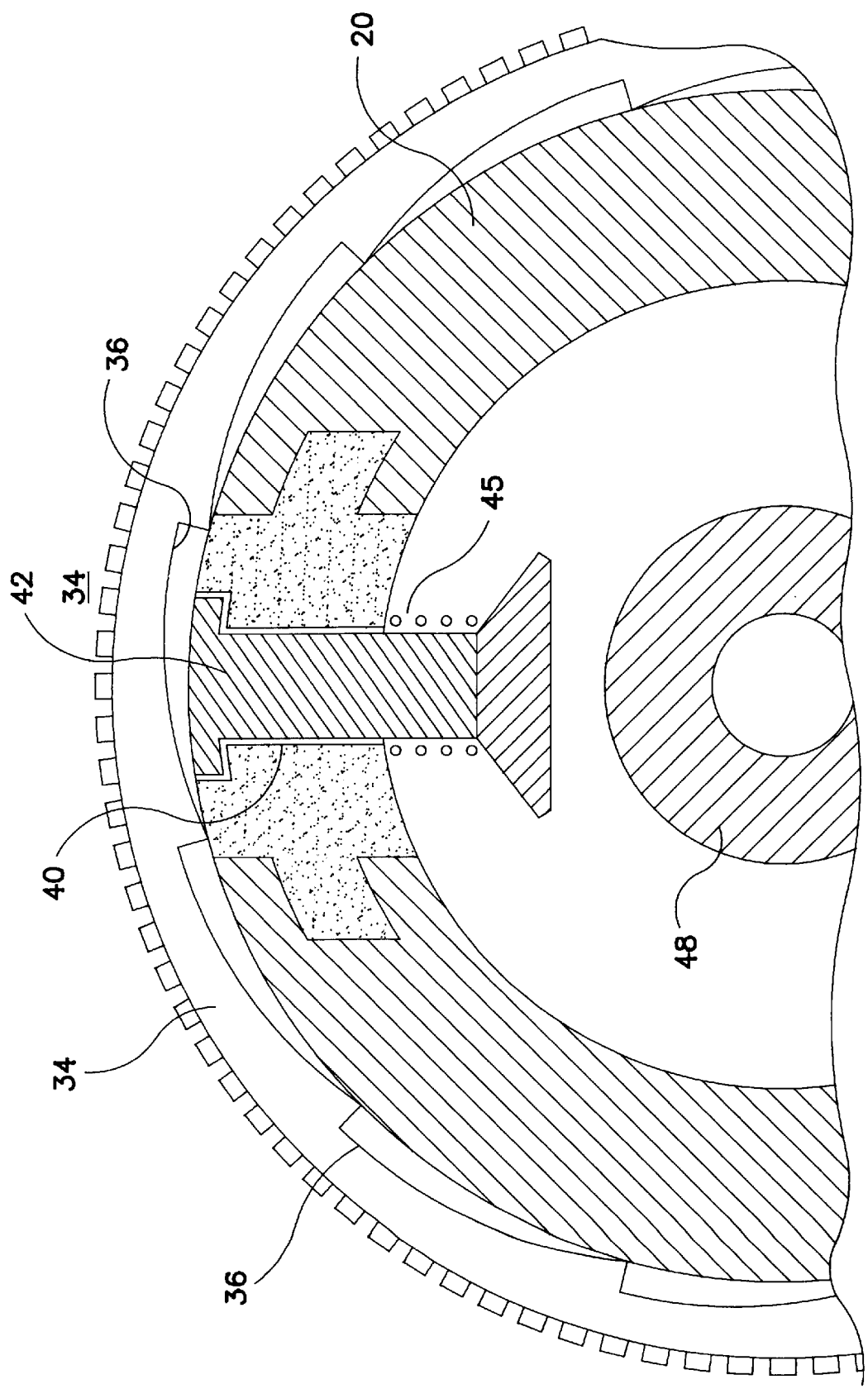
FIG. 3 is a sectional view showing details of the clutch pins coupling the drive cylinder to the respective sun gear.

FIG. 3 shows details of the engagement of drive sleeve with the selected sun gear. The drive sleeve 20 has a row of apertures 40 in which are mounted clutch pins 42 shown to best advantage in FIG. 3. Each clutch pin 42 is biased toward the axle 48 by a spring 45. As best shown in FIG. 1, clutch cylinder 44 slides on stationary axle 48 whose ends are secured to the forks (not shown) of the bicycle frame forcing the clutch pin 42 at the location of the clutch cylinder 44 into engagement with the internal ratcheted surface of the respective sun gear 34. The position of clutch cylinder 44 along drive sleeve 20 is selected by the operator pulling on one end of a cable 46 to position the clutch cylinder 44 against a biasing spring 27 such as to select the gear assembly 22 having the desired transmission ratio for driving the housing 12.

FIG. 2 also shows the exterior surface of ring gear 33 having a number of spring loaded retractable catches 43 which engage detent holes 49 in the stepped surface 14 when the gear assembly 22 turns in one direction but which slide over the detent holes 49 when the gear assembly 22 turns in the opposite direction so that the drive will only act in one direction of turning.

Figure 4:
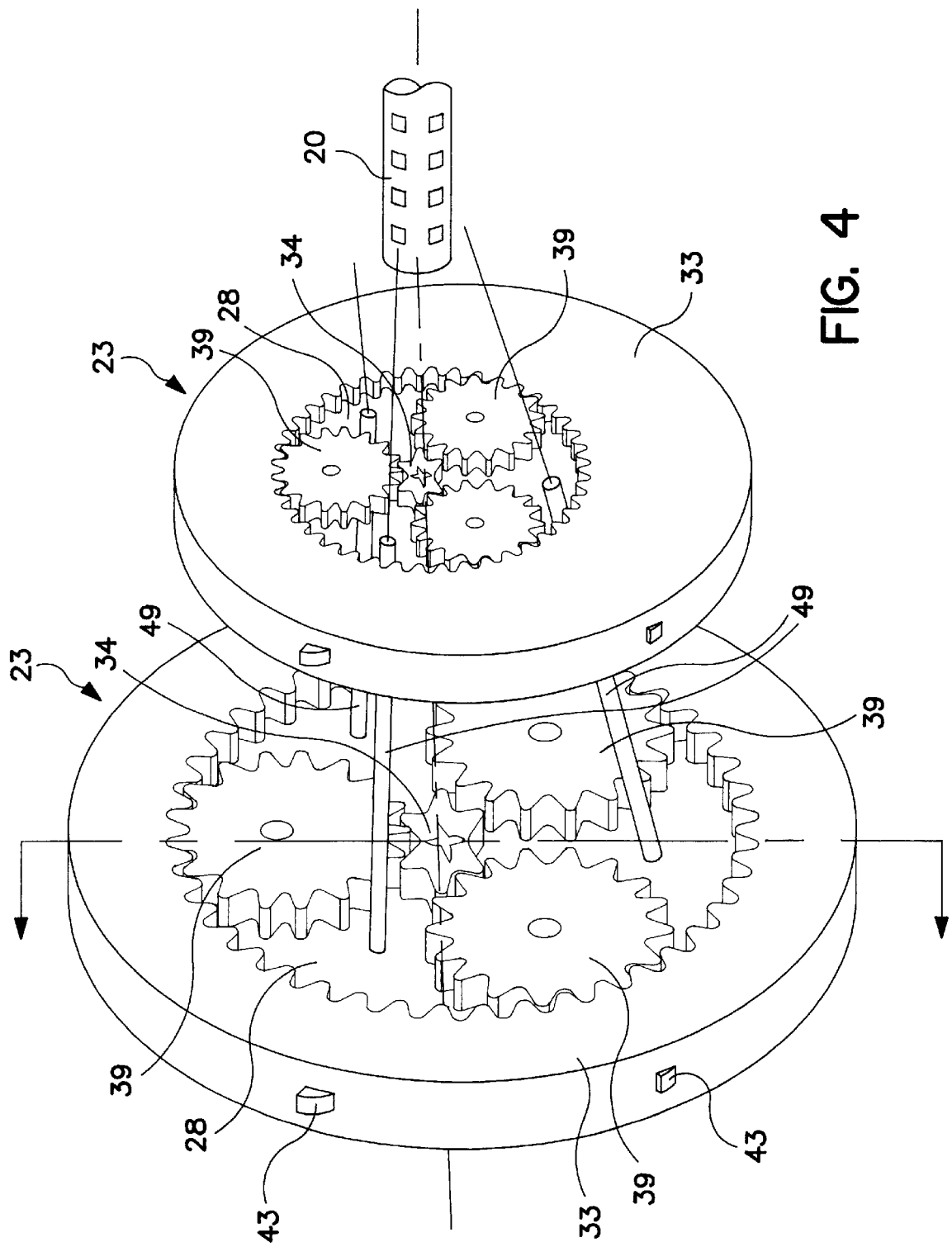
FIG. 4 shows another arrangement of the gear assemblies.
Figure 5:
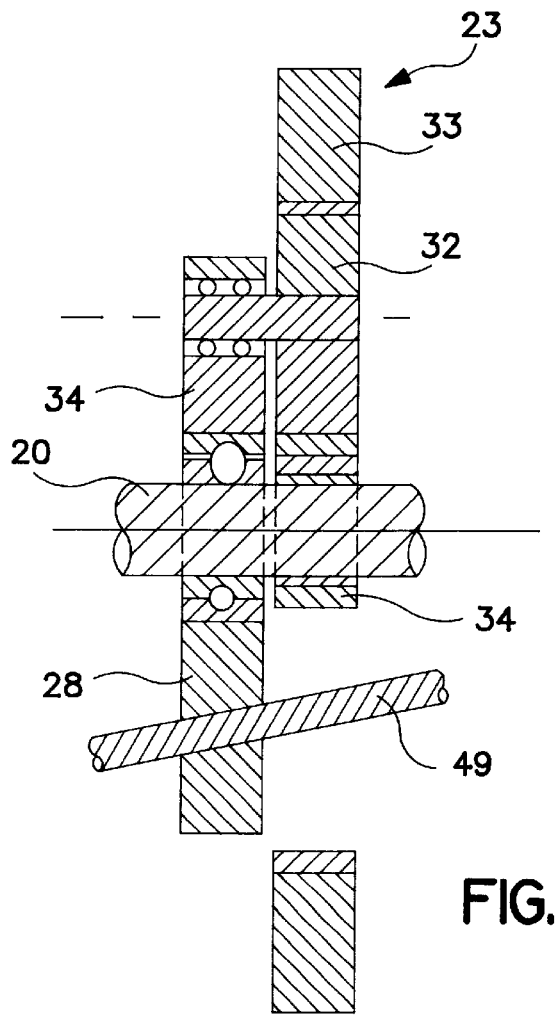
FIG. 5 is a sectional view of FIG. 4.
Figure 6:
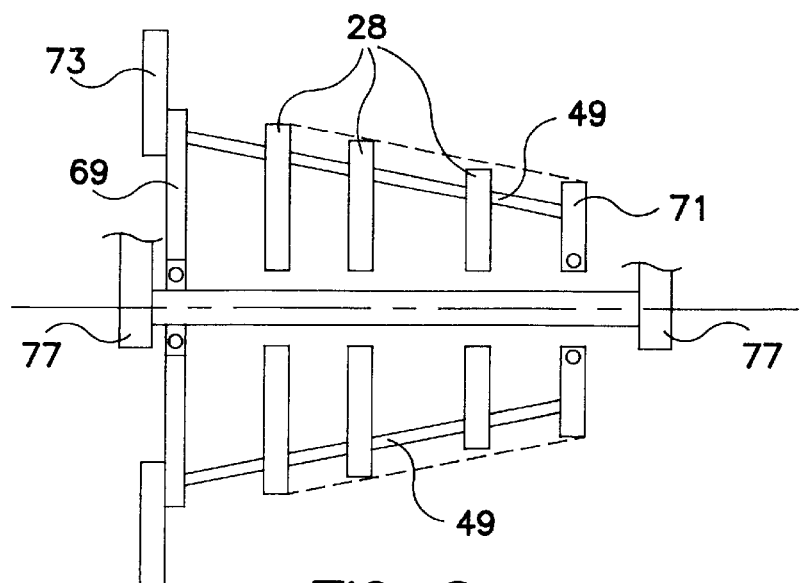
FIG. 6 shows the sprocket mounted on the cage including the base disks and the tie rods.

FIGS. 4 and 5 show an alternative arrangement of the gear assembly 23 according to which there is for each gear assembly 23 three planetary gears 39 engaging a sungear 34 and an internal surface of a ring gear 33. Each set of planetary gears 39 (two sets are shown in FIG. 4) are rotatably mounted on a base disk 28. Each base disk 28 is shown to best advantage in the sectional view of FIG. 5. Two base disks 28 are shown in FIG. 4. It should be understood, as shown in FIG. 6, that two or more will be used, each with its own set of planetary gears 39. As shown in FIG. 6, the size of the planetary gears 39 of each set is increased beginning with a smallest base disk on one end. All of the base disks are ganged together by tie rods 49 forming a cage. (Three tie rods 49 are shown in FIG. 4.) Ring gear 33 is nested inside the hub housing 12 (shown in FIG. 1) and is clutched by catches 43 to turn the hub 12 in one direction but is disengaged from the hub housing when turning in the opposite direction as shown in FIG. 1.

FIGS. 4 and 5 show the catches 43 that engage the internal stepped surface of hub housing 12. Hub housing 14 is not shown in FIGS. 4 and 5. but shown is to advantage in FIGS. 1 and 2. Selection of the sun gear in the arrangement of FIGS. 4 and 5 is identical to the arrangement shown in FIG. 3. The speed of rotation of the hub depends on which of the sungears is selected and locked causing the respective set of planetary gears to rotate around the selectively fixed sungear 34. Each of ends of tie rods 49 of the cage is secured to end plates 71 and 69 which are journalled to stationary shaft 20. Stationary shaft 20 has each end secured to the bicycle frame 77. Sprocket gear 73 is mounted end plate 69.

Variations and modifications of the embodiments described above may be suggested by reading the specification and studying the drawings that are within the scope of the invention. For example, the gear 38 is shown in the figs. as a sprocket gear but may be any other type of gear such as a spur gear used on an apparatus other than a bicycle. I therefore wish to define the scope of my invention by the appended claims.

I claim:

1. A transmission hub for a bicycle comprising:
   a hub housing (12) having a plurality of internal stepped surfaces (14) and rotatably mounted on a shaft assembly member;
   each stepped surface (14) being a cylindrical surface concentric with said hub housing;
   each said cylindrical surface being successively larger than a neighboring one of said cylindrical surfaces beginning with a smallest one of said plurality of internal stepped surfaces (14);
   said shaft assembly member having ends secured to a frame of a bicycle;
   a sprocket gear: rotatably mounted on said shaft assembly member
   a plurality of gear assembly means (22) operably arranged to provide that said hub housing is enabled to be coupled through a selected one of said plurality of gear assembly means to said sprocket gear.

2. The transmission hub of claim 1 wherein shaft assembly member comprises:
   a drive sleeve (20);
   said hub housing (12) being rotatably mounted on said drive sleeve (20);
   a stationary axel adapted for attachment to the frame of a bicycle;
   said drive sleeve (20) being rotatably mounted on said stationary axel (48);
   a drive gear (38) mounted on said drive sleeve (20);
   said plurality of gear assembly means (22) arranged for transmitting power from said drive sleeve (20) to said hub housing (12);
   each one of said gear assembly means having means for engaging an outside surface of said each one of said gear assembly means with a respective one of said stepped surfaces;
   means for engaging a selected one of said gear assembly means 22 with said drive sleeve;
   means for selecting said one of said gear assembly means;
   each one of said gear assembly means operably configured in combination with said means for selecting such that a transmission ratio between said hub housing and said drive gear is different for each one of said plurality of gear assemblies compared to all other said gear assemblies.

3. The transmission hub of claim 2 wherein said means for engaging comprises:
   a plurality of clutch pin means, one clutch pin means (42) for each gear assembly means and adapted to selectively couple any one of said gear assembly means to said drive sleeve;
   said drive sleeve (20) having a plurality of apertures with one of said plurality of clutch pin means positioned in one of said plurality of apertures respectively and biased toward said axle; and
   said means for selecting comprising:
      a clutch sleeve slidably mounted on said axle and positioned within said drive sleeve and configured such that said cam sleeve is positionable against an end of a selected one of said plurality of clutch pins forcing an opposite end of said selected one of said clutch pins into engagement with said selected one gear assembly means;
      a spring means for biasing said clutch sleeve in one direction on said axle;
      a cable means having one end secured to said clutch sleeve and another end accessible to a user for permitting said user to position said cam sleeve in contact with said selected one of said clutch pins by pulling said cable in a direction opposite said one direction.

4. The transmission hub of claim 2 wherein each said gear assembly means (22) comprises:
   a sun gear (34) having an interior bore with a ratchet means (36) for engaging an end of said selected clutch pin (42);
   at least one set of planetary gears (32), each one set having at least one pair of planetary gears;
   a base disk (28) supporting said at least one pair of planetary gears 32 providing that one of said at least one pair of planetary gears 32 engages said sun gear;

a ring gear having an internal gear surface engaging an outside one of said planetary gears;

a catch means (43) interposed between an outside surface of said ling gear (33) and internal surface of said hub-housing (12) for permitting said ring gear to be engaged with said hub housing (12) when said hub housing turns in one direction and be disengaged from said hub gear when said hub housing turns in an opposite direction.

5. The transmission hub of claim 2 wherein said drive gear (38) is a sprocket gear.

6. The transmission hub of claim 2 wherein an exterior surface of said hub housing is substantially conical.

7. The transmission hub of claim 2 wherein said means for engaging an outside surface of said each one of said gear assembly means (22) with a respective one of said stepped surfaces (14) comprises one of:

(i) a plurality of catch holes (45) arranged on a circumference on each one of said plurality of internal stepped surfaces of said hub-housing (12); and a plurality of spring loaded catches (43) in said outside surface of said each one of said gear assembly means biased to be engaged with said catch holes (45) when said gear assembly (22) rotates in one direction with respect to said hub housing (12) and to be disengaged from said catch holes (45) when said gear assembly (22) rotates in an opposite direction with respect to said hub housing (12);

(ii) a plurality of catch holes arranged on a circumference on each one of said outside surface of said each one of said gear assembly means (22); and a plurality of spring loaded catches in said internal surface (14) of each step of said stepped surface of said hub housing biased to be engaged with said catch holes when said gear assembly rotates in one direction with respect to said hub housing and to be disengaged from said catch holes when said gear assembly rotates in an opposite direction with respect to said hub housing.

8. The transmission hub of claim 1 wherein said shaft assembly member comprises:

a fixed axel having each end secured to a frame of said bicycle;

said sprocket gear being rotatably mounted on one end of said axel;

a drive sleeve concentric with and securely mounted on said axel; and wherein each said gear assembly means (23) comprises:
a sun gear (34) rotatably mounted on said drive sleeve;
means for selectively engaging said sun gear (34) with said drive sleeve (20);
a base disk (28) rotatably mounted on said drive sleeve;
at least one set of planetary gears (39) rotatably mounted on said base disk (28) with each planetary gear (39) of said set engaging said respective sun gear (34);
a ring gear having an internal gear surface engaging each one of said planetary gears;
a catch means (43) interposed between an outside surface of said ring gear (33) and internal surface of said hub-housing (12) for permitting said ring gear to be engaged with said hub housing (12) when said hub housing turns in one direction and be disengaged from said hub gear when said hub housing turns in an opposite direction;
a plurality of spacing means (49) for supporting each one of said gear assembly means in space relationship to one another and respective step surface (14) of said hub assembly (12) and securing said plurality of spacing means to said sprocket gear.

9. The hub of claim 8 wherein said means for selectively engaging said sun gear (34) with said drive sleeve (20) comprises:

a plurality of clutch pin means, one clutch pin means (42) for each gear assembly means and adapted to selectively couple any one of said gear assembly means to said drive sleeve; and said drive sleeve (20) having a plurality of apertures with one of said plurality of clutch pin means positioned in one of said plurality of apertures respectively and biased toward said axle; and said means for selecting comprising:
a clutch sleeve slidably mounted on said axle and positioned within said drive sleeve and configured such that said cam sleeve is slidable on said axel and positionable against an end of a selected one of said plurality of clutch pins forcing an opposite end of said selected one of said clutch pins into engagement with said selected one of sun gears of said gear assembly means;

a spring means for biasing said clutch sleeve in one direction on said axle;

a cable means having one end secured to said clutch sleeve and another end accessible to a user for permitting said user to position said cam sleeve in contact with said selected one of said clutch pins by pulling said cable in a direction opposite said one direction.

* * * * *